April 3, 1934.    G. A. BARKER    1,953,068
DIFFERENTIAL LUBRICATING DEVICE
Filed Oct. 20, 1932    2 Sheets-Sheet 1

Inventor
George A. Barker
By [signature]
Attorney

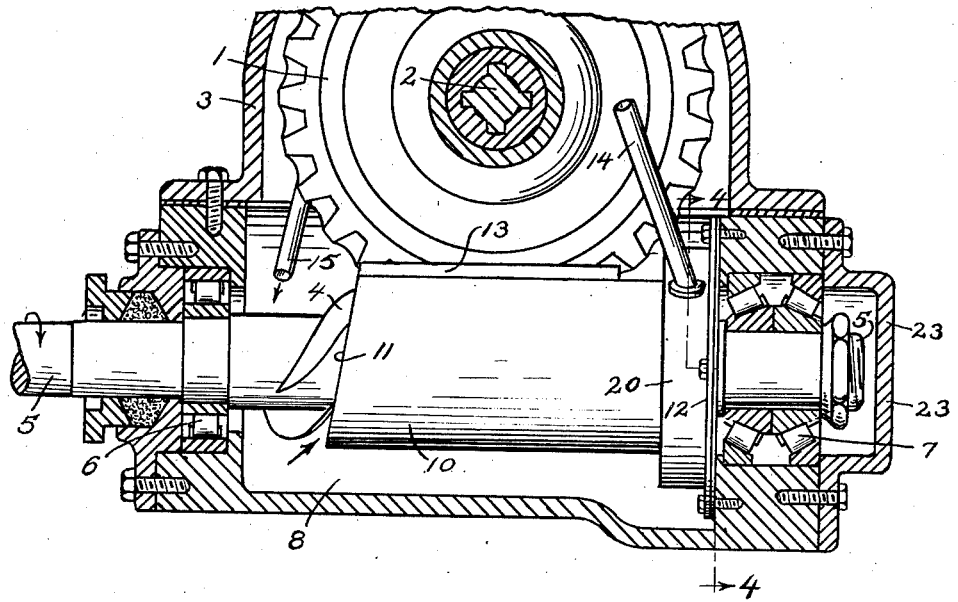
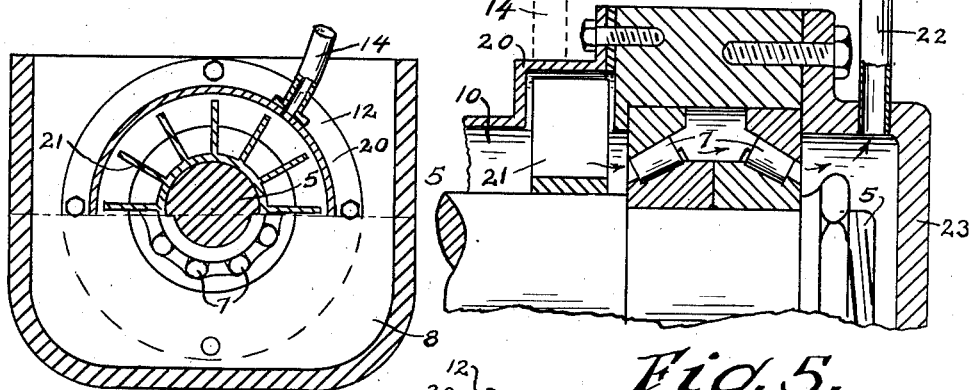
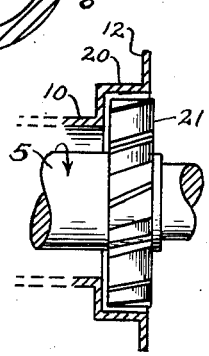
Inventor
George A. Barker
By [signature]
Attorney

Patented Apr. 3, 1934

1,953,068

UNITED STATES PATENT OFFICE 1,953,068

DIFFERENTIAL LUBRICATING DEVICE

George A. Barker, Rochester, N. Y.

Application October 20, 1932, Serial No. 638,768

20 Claims. (Cl. 184—11)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to a lubricating device for the rear axle of motor vehicles, but more particularly to those having a worm gear drive, in which the worm is located at the bottom of the axle housing or beneath the ring gear of the differential, this application being directed to improvements in the device set forth in my copending application, Serial No. 537,078, filed May 13, 1931.

One object of the invention is to utilize the worm or a rotor revolved by the propeller shaft to force lubricant to the other gears or to bearings of the axle or propeller shaft.

Another object of the invention is to provide uniform lubrication for the worm itself and to the other gears and bearings.

A still further object is to provide a lubricating device for the rear axle which will be of simple construction, economical to manufacture, and more efficient in operation than those formerly used.

With these and other objects in view the invention resides in the novel details of construction and combination of parts as will be disclosed more fully hereinafter and particularly pointed out in the claims.

Referring to the accompanying drawings forming a part of this specification in which like numerals designate like parts in all the views:

Fig. 3 is a view similar to Fig. 1 but illustrating a modification of the invention;

Fig. 4 is a transverse sectional view through the worm shaft taken as on the line 4—4 of Fig. 3 and looking in the direction of the arrows;

Fig. 5 is an enlarged detail sectional view of a modification of the parts shown in Fig. 3 constituting the oil pump; and Fig. 6 is a detail view partly in section showing a modification of the rotor illustrated in Fig. 4.

Figure 1:
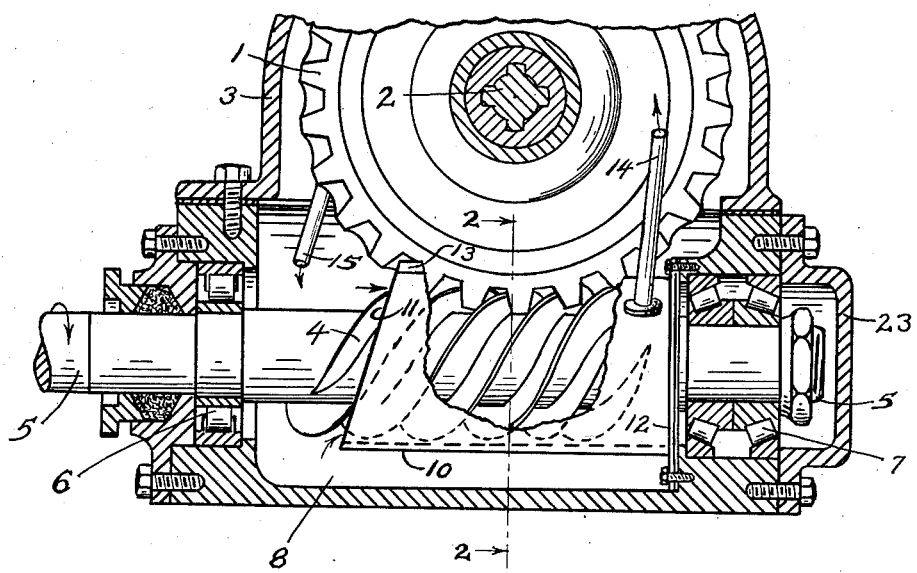
Fig. 1 is a partial sectional view of an assembly made in accordance with this invention.

In order that this invention may be better understood it is said that in worm drives of this type, where the driving worm is disposed below the worm gear, lubricant contained in the worm chamber is used to lubricate the bearings for the worm shaft as well as the enmeshed worm drive, but at low speeds only of the automobile are these parts adequately lubricated. At high speeds of rotation of the worm drive, the lubricant is forced to one end of the worm with such force that a great deal of it is forced upwardly from the worm chamber into the housing of the worm gear in the direction of rotation of the latter. It is the usual result that the enmeshed worm and gear are denuded of sufficient lubricant, and the journal bearings of the worm shaft at one end are left practically without lubricant. According to this invention there is proposed a construction by which this undesirable result is overcome and by which lubricant from the worm chamber may be directed positively to a distant bearing.

Referring to the drawings 1 indicates a worm gear mounted upon the usual axle 2 within the customary gear housing 3, and above a worm 4 formed by suitable threads upon the propeller shaft 5. This shaft is provided with a single race of roller bearings 6 at a point between the source of power and said worm, and with a double or thrust race of roller bearings 7 at the extreme end of said shaft. These bearings are suitably mounted in the end walls of the worm chamber 8 which is bolted or otherwise secured to the worm gear housing 3, suitable packing being provided to prevent escape of lubricant from the assemblage. Lubricant is initially supplied to the chamber through any suitable inlet therefor, the level of said lubricant when the parts are at rest being at such a height that the enmeshed portion of the worm drive will be covered.

A hollow cylinder 10 is disposed about the major portion of the worm 4, one end of said cylinder being open and obliquely cut as indicated at 11 to permit free entrance of the lubricant. The other end of the cylinder is provided with a laterally extending flange 12 by which the cylinder is secured to the end wall of the chamber 8, said cylinder being in free communication with the journal box containing the double race of roller bearings 7. Also it should be stated that the lubricant chamber 8 is in free communication with the other roller bearings 6.

Figure 2:
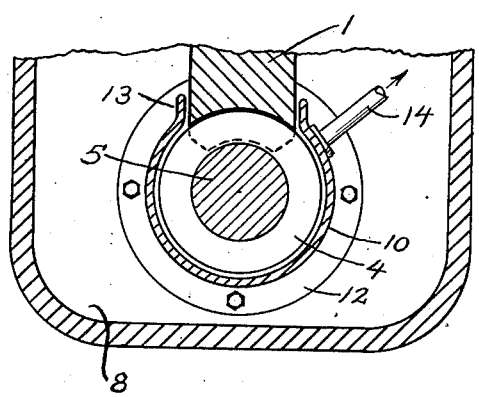
Fig. 2 is a transverse sectional view through the worm taken as on the line 2—2 of Fig. 1 and looking in the direction of the arrows.

The upper wall of the cylinder 10 is provided with a slot extending longitudinally of said cylinder and, as clearly shown in Fig. 2 the edge portions of said slot are turned outwardly as shown at 13 to form flanges lying in chordal planes of said cylinder, said flanges being extended a slight distance so as to be in close proximity to the side surfaces of the worm gear 1. An important feature of this invention is the formation of said cylinder with an internal diameter such that when the cylinder is properly fitted, there will be a space between the inner surface of said cylinder and the periphery of the worm 4 which is sufficient only for a thin film of lubricant. In the drawings there has been shown an appreciable clearance between the worm and cylinder as well as between the flanges (13) of the slot and the surface of the worm gear, but this is only for the purpose of illustration since there will also be just enough clearance between the worm gear and said flanges to permit a thin film of lubricant, as was the case just previously stated with respect to the worm. Also it is pointed out that the rotating gear 1 creates a centrifugal force on any lubricant disposed on the gear surface, wherefore this force counteracts any tendency of the lubricant to pass upwardly between the flanges 13 and the sides of said gear.

The slot is the only opening in the wall of the cylinder, and it is of a length sufficient only to permit clearance with the worm gear, as a result of which there is provided an imperforate wall at the end of the cylinder adjacent its securing flange 12. In this imperforate wall section there is provided an outlet conduit 14 for conveying the lubricant from within the cylinder to a distant bearing, and from said distant bearing the lubricant may return to the chamber 8 as through a second or return conduit 15, as indicated by the arrows.

From the foregoing description it will therefore be apparent that upon rotation of the shaft 5 the worm 4 will force the lubricant in the chamber 8 into the cylinder 10 from which it can only freely escape as through the conduit 14 due to the smallness of clearance between said cylinder and the worm drive. The worm will create considerable pressure on the lubricant while in the cylinder and this pressure also will force lubricant to the bearings 7 to keep them lubricated. Also the hereinbefore mentioned and undesirable pumping action, by which the lubricant is forced practically-bodily from the chamber 8, is eliminated due to the presence of the cylinder 10 and hence the bearings 6 will be adequately lubricated at all speeds.

In the modification shown in Fig. 3 the same principle is involved and much of the hereinbefore described construction is repeated. However, the securing flange 12 is here shown laterally connected to an enlarged circular chamber portion 20 of a width as clearly seen to lie within the space between said flange and the end of the slot through which the worm gear rotates. In other words, this chamber 20 clears the worm gear, and the outlet conduit 14 is directly connected through the circumferential wall of said chamber. Within this chamber, and rigidly mounted upon the shaft 5, is a rotor generally indicated by the numeral 21 whose blades are radially disposed and lie in axial planes of said shaft. These blades are of a length to just clear the inner circumferential surface of the rotor chamber 20 as a result of which the lubricant under centrifugal force is impelled by the rotor blades into the outlet conduit 14. However, in the previous construction as well as in this modification, the conduit 14 is of a restricted diameter as a result of which the lubricant forced therethrough may travel under considerable pressure, and therefore to a considerable distance. Because of the restricted diameter of this conduit, the blades of the rotor will not cause such a drainage of lubricant from the cylinder and rotor chamber as to prevent lubricant reaching the bearings 7.

In Fig. 5 is shown in greater detail the construction of the rotor, its chamber, and the adjacent bearings, the discharge conduit 14 being indicated in dotted lines as connected to the rotor chamber and shown in full lines at 22 as connected to the cap plate 23 disposed about the end of the shaft 5. By this showing there is intended to be conveyed the idea that there may be provided a single discharge conduit such as 14 as hereinbefore specified, and/or a discharge conduit such as 22 so disposed as to convey the lubricant to a distant bearing after having completely passed through the bearings 7, the latter serving to supplement the conveyance of lubricant to distant bearings. If one of these conduits is not desired, a suitable threaded plug or cap may be applied to the opening provided therefor.

According to the modification shown in Fig. 6 the rotor 21 is provided with blades which are obliquely set with reference to an axial plane of the shaft 5, as a result of which, during rotation of said shaft, the lubricant will be forced more positively in a direction toward the bearings 7, as will be readily understood.

It is obvious that those skilled in the art may vary the details of construction as well as arrangements of parts without departing from the spirit of the invention, and therefore it is not desired to be limited to the foregoing except as may be required by the claims.

Having described my invention, what I claim as new and wish to secure by Letters Patent is:

1. A housing having a lubricant containing chamber at the bottom thereof; a worm gear mounted in said housing above said chamber; a worm meshing with said gear, said worm being located in said chamber underneath said gear; and a cylinder located in said chamber and enclosing the worm and the portion of the gear cooperating therewith, said cylinder open at both ends and imperforate except where said gear passes thereinto, one of said ends encompassing a passage to a worm-shaft bearing.

2. A housing having a lubricant containing chamber at the bottom thereof; a worm gear mounted in said housing above said chamber; a worm meshing with said gear, said worm being located in said chamber underneath said gear; a cylinder located in said chamber and enclosing the worm and the portion of the gear cooperating therewith, said cylinder open at both ends and having a restricted outlet and being otherwise imperforate except where said gear passes thereinto; and a conduit connected to said outlet for conveying lubricant to a distant bearing.

3. A housing having a lubricant containing chamber at the bottom thereof; a worm gear mounted in said housing above said chamber; a worm meshing with said gear, said worm being located in said chamber underneath said gear; a cylinder located in said chamber and enclosing the worm and the portion of the gear cooperating therewith; a conduit connecting with the interior of said cylinder; and means to positively direct lubricant into said conduit.

4. A housing having a lubricant containing chamber at the bottom thereof; a worm gear mounted in said housing above said chamber; a worm meshing with said gear, a casing located in said chamber and enclosing the worm and the portion of the gear cooperating therewith; a conduit connecting with the interior of said casing;

and means within said casing to positively direct lubricant into said conduit.

5. A housing having a lubricant containing chamber at the bottom thereof; a worm gear mounted in said housing above said chamber; a worm meshing with said gear, a casing located in said chamber and enclosing the worm and the portion of the gear cooperating therewith; a conduit connecting with the interior of said casing; and means coaxial with said worm to positively direct lubricant into said conduit.

6. A housing having a lubricant containing chamber at the bottom thereof; a worm gear mounted in said housing above said chamber; a shaft; a worm formed upon said shaft and meshing with said gear; said worm being located in said chamber underneath said gear; a cylinder located in said chamber and enclosing the worm and the portion of the gear cooperating therewith; a conduit connecting with the interior of said cylinder; and means carried by said shaft to positively direct lubricant into said conduit.

7. A housing having a lubricant containing chamber at the bottom thereof; a worm gear mounted in said housing above said chamber; a shaft having a worm meshing with said gear, said worm being located in said chamber underneath said gear; a cylinder located in said chamber and enclosing the worm and the portion of the gear cooperating therewith; a conduit connecting with the interior of said cylinder; and means comprising a rotor carried by the worm shaft to positively direct lubricant into said conduit.

8. A pump for lubricant, the same comprising a worm gear; a worm enmeshed with said gear; and a casing enclosing the enmeshed portions of said gear and worm, said casing provided with an inlet and a restricted outlet for the lubricant said outlet having attached thereto a conduit for conveying lubricant and otherwise imperforate except where said gear passes thereinto.

9. A pump for lubricant, the same comprising a worm gear; a worm enmeshed with said gear; a casing enclosing the enmeshed portions of said gear and worm, said casing provided with an inlet for the lubricant and further provided with a chamber portion, the latter having an outlet for the lubricant; and means in said chamber to positively direct lubricant into said outlet.

10. A pump for lubricant, the same comprising a worm gear; a worm enmeshed with said gear; a casing enclosing the enmeshed portions of said gear and worm, said casing provided with an open end constituting an inlet for the lubricant and further provided with an enlarged chamber portion at the other end, said chamber portion having an outlet for the lubricant; and a rotor in said portion to positively direct lubricant into said outlet.

11. A pump for lubricant, the same comprising a worm gear; a worm enmeshed with said gear; a casing enclosing the enmeshed portions of said gear and worm, said casing provided with an inlet and an outlet for the lubricant said outlet having a conduit means for conveying lubricant and otherwise imperforate except where said gear passes thereinto; and means in said casing to positively direct lubricant into said outlet.

12. A housing having a lubricant containing chamber at the bottom thereof; a worm gear mounted in said housing above said chamber; a worm meshing with said gear, said worm being located in said chamber underneath said gear and having bearings disposed in opposite walls of said chamber; a cylinder located in said chamber and enclosing the worm and the portion of the gear cooperating therewith, said cylinder open at both ends and having a restricted outlet and being otherwise imperforate except where said gear passes thereinto, said cylinder having flanged connection at one end to a wall of said chamber; a conduit connecting with said restricted outlet; and means to positively direct lubricant into said conduit.

13. A housing having a lubricant containing chamber at the bottom thereof; a worm gear mounted in said housing above said chamber; a worm meshing with said gear, said worm being located in said chamber underneath said gear and having bearings disposed in opposite walls of said chamber; a cylinder located in said chamber and enclosing the worm and the portion of the gear cooperating therewith, said cylinder open at both ends and having a restricted outlet and being otherwise imperforate except where said gear passes thereinto, said cylinder having flanged connection at one end to a wall of said chamber, said cylinder disposed to establish free lubricant communication through one of its open ends between the interior of said cylinder and one of the worm bearings; a conduit connecting with said restricted outlet, and means to positively direct lubricant into said conduit.

14. A housing having a lubricant containing chamber at the bottom thereof; a worm gear mounted in said housing above said chamber; a worm meshing with said gear, said worm being located in said chamber underneath said gear and having bearings disposed in opposite walls of said chamber; a cylinder located in said chamber and enclosing the worm and the portion of the gear cooperating therewith, said cylinder open at both ends and having a restricted outlet and being otherwise imperforate except where said gear passes thereinto, said cylinder having flanged connection at one end to a wall of said chamber, said cylinder disposed to establish free lubricant communication through one of its open ends between the interior of said cylinder and one of the worm bearings, a conduit connecting with said restricted outlet and means to positively direct lubricant through said outlet.

15. In a device of the character described, a housing having a lubricant containing chamber at the bottom thereof, a worm mounted in said housing; a casing, having an inlet and outlet, located in said chamber and encompassing a portion of said worm, means rotatable with said worm to force lubricant to said outlet, and a conduit connected to the casing at said outlet to conduct the lubricant to a desired location.

16. In a device of the character described, a housing having a lubricant containing chamber at the bottom thereof, a shaft mounted in said housing; a worm mounted on said shaft, a gear mounted adjacent said shaft and meshing with said worm; a casing, having an inlet and outlet, located in said chamber and encompassing a portion of said shaft, means comprising a rotor operatively connected with said shaft to force lubricant to said outlet and a conduit connected to the casing at said outlet to conduct lubricant to a remote location.

17. In a device of the character described, a housing having a lubricant containing chamber; a shaft rotatable in said chamber and carrying a worm and a rotor; a gear meshing with said worm; and a casing encompassing a portion of said worm and having an inlet and an outlet, the latter being adjacent said rotor.

18. A housing having a lubricant containing chamber; a worm gear in said housing; a worm meshing with said gear and located in said chamber; a casing in said chamber and enclosing a portion of said worm; a conduit connecting with the interior of said casing; and means to positively direct lubricant from said casing into said conduit.

19. A housing having a lubricant containing chamber; a worm gear in said housing; a worm meshing with said gear and located in said chamber; a casing in said chamber inclosing a portion of said worm; a conduit connecting with the interior of said casing; said conduit conveying lubricant to a desired location.

20. A pump for lubricant, comprising a worm gear, a worm enmeshed with said gear, and a casing enclosing the enmeshed portion of the said gear and worm, said casing provided with an inlet and an outlet for the lubricant, said outlet having attached thereto a conduit for conveying lubricant, said casing being imperforate throughout the length of its walls between the points of entry and exit of the inclosed portion of said gear except where the latter extends into said casing.

GEORGE A. BARKER.